Oct. 20, 1931.  H. B. HULL  1,827,750

REFRIGERATING APPARATUS

Filed Nov. 25, 1927

Inventor

Harry B. Hull

By Spencer, Hardman & Feb

Attorney

Patented Oct. 20, 1931

1,827,750

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed November 25, 1927. Serial No. 235,667.

This invention relates to an ice cream cabinet provided with mechanical refrigerating means and with a hold-over to smooth out the temperature fluctuations in the cabinet or to furnish refrigeration during periods of idleness of the mechanical refrigerating means.

An object of the invention is to provide an ice cream cabinet having a large hold-over capacity.

Another object of this invention is to provide an ice cream cabinet having efficient insulation.

Another object is to provide an advantageous type of hold-over receptacle.

Another object is to provide an ice cream cabinet of relatively narrow width.

Further objects and advantages of the present invention will be apparent from the following description, reference being had to the accompanying drawings, wherein a preferred form of the present invention is clearly shown.

Figure 1:
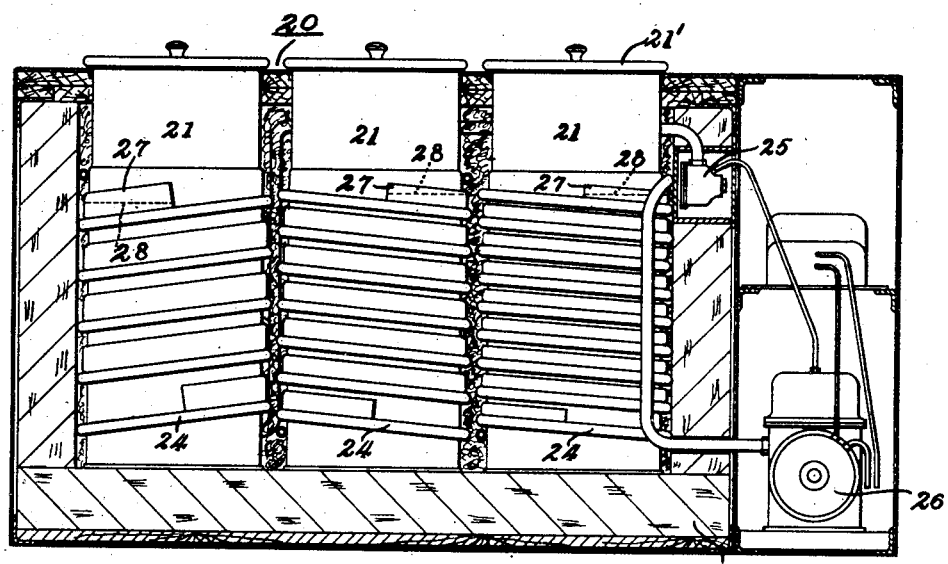
Fig. 1 shows a vertical cross-section of the ice cream cabinet.
Figure 2:
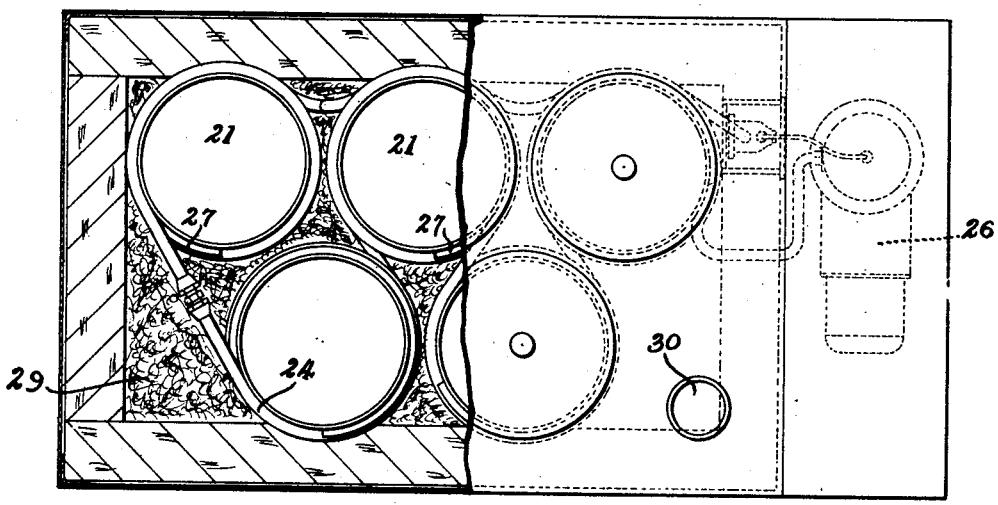
Fig. 2 shows a plan view with a section thereof broken away.

The ice cream cabinet 20 may comprise a plurality of sleeves 21 arranged in rows, the sleeves of one row being placed in staggered relation to the sleeves of another row. These sleeves may be provided with covers 21' in the usual manner. Surrounding the sleeves 21 may be provided the usual insulation 22 of the cabinet and the refrigerating circuit 24 may be wound around the several sleeves 21 in any desired manner. An expansion valve 25 may be provided for controlling the flow of refrigerant from the compressor 26 and thermostatic means of any character may be provided for controlling the operation of the compressor.

In between the spirals of the refrigerating line 24 may be provided closed spiral tubes 27 in close thermal contact with the refrigerating line 24 and also with the sleeve 21. These spiral pipes 27 may be partially filled with a hold-over liquid intended to be completely frozen in order that it may remove the relatively large latent heat of fusion from the ice cream within the sleeves 21. A suitable composition which may be introduced into the pipes 27 is the cryohydrate composition of a suitable salt so selected that its freezing point will be at the temperature most beneficial to the ice cream. This cryohydrate composition may have added thereto some substance such as gelatin or glycerine which prevents the freezing of the cryohydrate composition into a solid mass. Since the tubes are only partially filled as indicated at 28, the freezing of the hold-over into a mushy composition allows it to flow into the vacant space above the liquid level 28.

Suitable insulation 29 may be inserted in between the sleeve 21 in order that a more thorough insulation of the ice cream container may be obtained. A receptacle 30 may be provided in the cabinet, if desired, for utensils.

By placing the sleeves 21 in staggered relation, the width of the cabinet can be materially reduced and this is a very important feature since ordinarily there is not very much room in a soda fountain counter for the width of an ice cream cabinet. This staggering of the sleeves 21 can be made especially effective with the use of a freezing hold-over, since the hold-over compartment can be made relatively small.

While I have shown the sleeve 21 as separate from the coils 24 or 27, I may make all or part of the sleeve solely of one or both the coils 24 and 27. The sleeve may be part or all of the container for the refrigerant or the hold-over, which under certain conditions need not be a coil.

When it is desirable to vary the relative size of the refrigerating means on the sleeves, as by increasing the number of turns in the manner indicated in Fig. 1, I may vary the relative size of the hold-over coils in order to obtain the required volume of hold-over. For instance, since the sleeve 21 shown at the left in Fig. 1 has a smaller number of turns of refrigerant pipe 24 than the next sleeve 21, because it is the first to receive the refrigerant from the condenser, I may increase the cross-section of the hold-over coil 27 of the first mentioned sleeve in order to equalize or adjust the volume of hold-over material in relation to the hold-over material of other sleeves. By this method I may provide all of the sleeves with the same amount of hold-over material, or I may establish any relation of hold-over capacity for the sleeves which I may desire. In the embodiment shown in Fig. 1, the number of turns of the refrigerant pipe is gradually increased to provide the same amount of refrigeration to each sleeve, and the relative cross-section of the hold-over is decreased in order to provide each sleeve with the same amount of hold-over. Any other desired relation can be established.

While the form of embodiment of the invention as herein disclosed, constitutes a preferred form, it is to be understood that other forms might be adopted, all coming within the scope of the claims which follow.

What is claimed is:

1. An ice cream cabinet having sleeves therein, refrigerant conduits on some of said sleeves having a different number of turns on said sleeves, and hold-over conduits of different cross-sectional area adjacent said first mentioned conduits.

2. An ice cream cabinet having sleeves therein arranged in rows, the sleeves of one row being staggered with relation to the sleeves of another row in which said sleeves have individual freezing hold-over means, and mechanical refrigeration means in thermal relation to said hold-over means and in direct thermal relation to said sleeves, said hold-over comprising a cryohydrate composition.

3. An ice cream cabinet having sleeves therein arranged in rows, the sleeves of one row being staggered with relation to the sleeves of another row in which said sleeves have individual freezing hold-over means, and mechanical refrigeration means in thermal relation to said hold-over means and in direct thermal relation to said sleeves, said hold-over comprising a cryohydrate composition having a substance added to said cryohydrate composition to prevent the formation of a solid mass when frozen.

4. Refrigerating apparatus comprising in combination two series of interspersed coils surrounding a space, one of said coils having refrigerant therein, and the other having a freezing hold-over therein, said hold-over comprising a cryohydrate composition.

5. A pair of coils in thermal relation and surrounding a cylindrical space, one of said coils having refrigerant therein, and the other having a freezing hold-over therein, said hold-over comprising a cryohydrate composition having a substance added to said cryohydrate composition to prevent the formation of a solid mass when frozen.

6. A pair of coils arranged to form a column, one of said coils having a refrigerant therein and the other a freezing hold-over, said hold-over comprising a cryohydrate composition.

7. A pair of coils arranged to form a column, one of said coils having a refrigerant therein and the other a freezing hold-over, said hold-over comprising a cryohydrate composition having a substance added to said cryohydrate composition to prevent the formation of a solid mass when frozen.

8. An ice cream cabinet having a sleeve therein, a refrigerant conduit in contact with said sleeve and hold-over means in contact with the sleeve and with said refrigerant conduit, said hold-over means including a cryohydrate composition.

9. An ice cream cabinet having a sleeve therein, a refrigerant conduit in contact with said sleeve and hold-over means in contact with the sleeve and with said refrigerant, said hold-over means including a cryohydrate composition having a substance added to said cryohydrate composition to prevent the formation of a solid mass when frozen.

10. An ice cream cabinet having a sleeve therein, a refrigerant conduit in contact with said sleeve and hold-over means in contact with the sleeve and with said refrigerant, said hold-over means including a cryohydrate composition and insulation immediately surrounding said conduits and hold-over means.

11. An ice cream cabinet having a sleeve therein, a refrigerant conduit in contact with said sleeve and hold-over means in contact with the sleeve and with said refrigerant, said hold-over means including a cryohydrate composition having a substance added to said cryohydrate composition to prevent the formation of a solid mass when frozen and insulation immediately surrounding said conduit and hold-over means.

In testimony whereof I hereto affix my signature.

HARRY B. HULL.